(12) United States Patent
Abe et al.

(10) Patent No.: US 12,546,803 B2
(45) Date of Patent: Feb. 10, 2026

(54) PROBE-CARD MULTILAYER WIRING SUBSTRATE AND PROBE CARD

(71) Applicant: Japan Electronic Materials Corporation, Hyogo (JP)

(72) Inventors: Satoshi Abe, Hyogo (JP); Tetsuo Fujimoto, Hyogo (JP); Yusuke Harada, Hyogo (JP); Shinya Hori, Hyogo (JP)

(73) Assignee: JAPAN ELECTRONIC MATERIALS CORPORATION, Hyogo (JP)

( * ) Notice: Subject to any disclaimer, the term of this patent is extended or adjusted under 35 U.S.C. 154(b) by 564 days.

(21) Appl. No.: 18/029,676

(22) PCT Filed: Nov. 17, 2020

(86) PCT No.: PCT/JP2020/042859
§ 371 (c)(1),
(2) Date: Mar. 31, 2023

(87) PCT Pub. No.: WO2022/107225
PCT Pub. Date: May 27, 2022

(65) Prior Publication Data
US 2023/0408547 A1    Dec. 21, 2023

(51) Int. Cl.
*G01R 1/073* (2006.01)
*G01R 1/20* (2006.01)
(Continued)

(52) U.S. Cl.
CPC ......... *G01R 1/07314* (2013.01); *G01R 1/203* (2013.01); *G01R 1/44* (2013.01); *H10D 1/47* (2025.01)

(58) Field of Classification Search
CPC ...... G01R 1/07314; G01R 1/203; G01R 1/44; G01R 31/2863; G01R 31/2874; G01R 31/2889; H10D 1/47
See application file for complete search history.

(56) References Cited

U.S. PATENT DOCUMENTS 7,304,248 B2 * 12/2007 Tada ............... H05K 1/167
361/761
7,735,221 B2 * 6/2010 Inoue ............ G01R 1/06766
29/846

(Continued)

FOREIGN PATENT DOCUMENTS

JP    H09330995 A     12/1997
JP    2014089089 A    5/2014
JP    2017201263 A    11/2017

OTHER PUBLICATIONS

International Search Report and Written Opinion issued in corresponding International Patent Application No. PCT/JP2020/042859 (with English translation of International Search Report) mailed Feb. 9, 2021 (5 pages).

*Primary Examiner* — Vinh P Nguyen
(74) *Attorney, Agent, or Firm* — Kilyk & Bowersox, P.L.L.C.

(57) ABSTRACT

An object of the present invention is to provide a multilayer wiring substrate for probe card capable of preventing deterioration of a thin film resistor 30. Provided is a multilayer wiring substrate (an ST substrate) 15 for probe card, the multilayer wiring substrate being provided on a wiring path between an external terminal 120 and a probe 17 of a probe card 100, and having a base insulating film 41 formed on a top surface of the multilayer wiring substrate, in which the multilayer wiring substrate 15 includes: a thin film resistor 30 including a thin film formed on the base insulating film 41 and to which a pair of connection electrodes 33 are connected; an embedded heat sink 31 that is embedded to face the thin film resistor 30 via the base insulating film 41 and includes a material having a thermal conductivity higher than that of the base insulating film 41; and a cover insulating film 43 that is formed in a region corresponding to the thin film resistor 30 and covers the thin film resistor 30, and (Continued)

the embedded heat sink 31 includes a heat dissipating portion 50 that is not covered with the base insulating film 41 outside a region in which the cover insulating film 43 is formed.

11 Claims, 11 Drawing Sheets

(51) Int. Cl.
*G01R 1/44* (2006.01)
*H10D 1/47* (2025.01)

(56) References Cited

U.S. PATENT DOCUMENTS

| | | | |
|---|---|---|---|
| 8,299,812 B2* | 10/2012 | Nitta | G01R 31/2889 |
| | | | 324/762.01 |
| 9,271,393 B2* | 2/2016 | Otabe | H05K 1/0271 |
| 11,099,227 B2* | 8/2021 | Otabe | H05K 1/0266 |
| 2014/0118017 A1 | 5/2014 | Otabe et al. | |
| 2020/0400739 A1 | 12/2020 | Otabe et al. | |

* cited by examiner (a) plan layout diagram (b) A-A cross-sectional view (a) plan layout diagram (b) B1-B1 cross-sectional view (a) plan layout diagram (b) B2-B2 cross-sectional view (a) plan layout diagram (b) B3-B3 cross-sectional view (a) plan layout diagram (b) B4-B4 cross-sectional view (a) plan layout diagram (b) B5-B5 cross-sectional view

PROBE-CARD MULTILAYER WIRING SUBSTRATE AND PROBE CARD

This application is a National Stage Application of PCT/JP2020/042859, filed Nov. 17, 2020.

TECHNICAL FIELD

The present invention relates to a multilayer wiring substrate for probe card and a probe card, and more specifically to improvement of the multilayer wiring substrate for probe card, the multilayer wiring substrate being provided on a wiring path between an external terminal of the probe card and a probe and including a thin film resistor.

BACKGROUND ART

The probe card is an inspection apparatus used for inspecting electrical characteristics of a semiconductor device formed on a semiconductor wafer, and a large number of probes to be respectively brought into contact with electrode pads on the semiconductor wafer are provided on the multilayer wiring substrate. Electrical characteristic inspection of the semiconductor device is performed by electrically connecting a tester apparatus that inputs and outputs a test signal with the semiconductor device via the probe and the multilayer wiring substrate.

On a wiring circuit of the multilayer wiring substrate, the thin film resistor as a resistance element for performing impedance matching, power control, and the like is provided. The thin film resistor is disposed to be sandwiched between upper and lower insulating layers, a metal material such as a nickel-chromium (Ni—Cr) alloy is used for the thin film resistor, and a resin material such as a polyimide synthetic resin is used for the insulating layer. Such a thin film resistor has a problem that the thin film resistor is deteriorated by a change in environmental temperature due to a heat cycle test or the like and heat generation of the thin film resistor itself at the time of inspection.

Generally, a linear expansion coefficient of the resin material is larger than that of the metal material. Therefore, for example, when the thin film resistor is used in the heat cycle test, there is a problem that the thin film resistor is deteriorated by thermal stress due to a difference in linear expansion coefficient from an insulating film. For example, there is a problem that wrinkles occur in the thin film resistor and a resistance value varies. In addition, since the thin film resistor is sandwiched between the insulating layers including a resin material having a low thermal conductivity, there is a problem that heat generated at the time of inspection is not released to the outside but accumulated between the insulating layers, and the thin film resistor is deteriorated. For example, there is a problem that the thin film resistor is fused.

Therefore, in the multilayer wiring substrate for probe card, a method of suppressing deterioration of the thin film resistor due to thermal stress has been proposed (for example, Patent Literature 1). FIG. 11 is an explanatory diagram schematically illustrating a main part of a conventional multilayer wiring substrate 6A for probe card. In the illustrated multilayer wiring substrate 6A, first to third insulating layers 611 to 613 are sequentially laminated, a thin film resistor 600 is formed on a second insulating layer 612, and a thermal expansion/contraction suppression layer 601 is formed immediately below the thin film resistor 600 with the second insulating layer 612 interposed therebetween. The linear expansion coefficient of the thermal expansion/contraction suppression layer 601 including the metal material is smaller than that of the insulating layers 611 to 613 including the resin material, and by providing such a thermal expansion/contraction suppression layer 601, it is possible to suppress thermal stress generated in the thin film resistor 600 due to the difference in linear expansion coefficient from the insulating layers 611 to 613.

However, since the thermal expansion/contraction suppression layer 601 is embedded between the first insulating layer 611 and the second insulating layer 612, it cannot be expected that heat dissipation of the thin film resistor 600 is promoted by the thermal expansion/contraction suppression layer 601. That is, it is not possible to deal with heat generated in the thin film resistor 600 at the time of inspection. Therefore, an effect of preventing deterioration due to thermal stress is limited, and there is a problem that fusing or the like of the thin film resistor 600 cannot be prevented.

Therefore, a method of preventing fusing or the like of the thin film resistor 600 due to heat generation at the time of inspection has been proposed (for example, Patent Literature 2). FIG. 12 is an explanatory diagram schematically illustrating a main part of a conventional multilayer wiring substrate 6B for probe card. In the illustrated multilayer wiring substrate 6B, a pedestal portion 602 is formed immediately below the thin film resistor 600 with the second insulating film 612 interposed therebetween, and a heat dissipating portion 603 is formed immediately above the thin film resistor 600 with the third insulating film 613 interposed therebetween. Further, the pedestal portion 602 and the heat dissipating portion 603 are connected by a connecting portion 604.

The pedestal portion 602, the heat dissipating portion 603, and the connecting portion 604 all include the metal material, and have a small linear expansion coefficient and a high thermal conductivity as compared with the insulating layers 611 to 613 including the resin material. That is, the pedestal portion 602 corresponds to the thermal expansion/contraction suppression layer 601, and has an effect of preventing deterioration of the thin film resistor 600 due to thermal stress. In addition, since the heat generated in the thin film resistor 600 can be dissipated from the heat dissipating portion 603 into atmosphere through the pedestal portion 602 and the connecting portion 604, it can be expected to suppress fusing or the like of the thin film resistor 600.

CITATION LIST

Patent Literatures

Patent Literature 1: JP 2014-089089 A
Patent Literature 2: JP 2017-201263 A

SUMMARY OF INVENTION

Technical Problem

In the conventional multilayer wiring substrate 6B described above, in order to connect the pedestal portion 602 and the heat dissipating portion 603, it is necessary to provide the connecting portion 604 penetrating the second insulating layer 612 and the third insulating layer 613, and there is a problem that a structure of the multilayer wiring substrate is complicated.

In addition, since the third insulating layer 613 is formed thick, there is also a problem that it is not easy to form such a connecting portion 604. The insulating layers 611 to 613 needs to be formed on a surface having larger irregularities as the layer is formed on an upper side, and needs to be formed thicker to secure coverage for the irregularities. In particular, on the thin film resistor 600, a pair of electrodes (not illustrated) and an insulating layer (not illustrated) that defines an effective length of the thin film resistor 600 are formed to overlap each other. Therefore, the third insulating layer 613 is formed on a surface having large irregularities, and needs to be formed thicker than the first and second insulating layers 611 and 612. Due to these circumstances, the heat of thin film resistor 600 is more easily transferred to the pedestal portion 602 through the second insulating layer 612 than transferred to the heat dissipating portion 603 through the third insulating layer 613, and the connecting portion 604 that transfers the heat of pedestal portion 602 to the heat dissipating portion 603 is required. For the same reason, there is a problem that it is difficult to form the connecting portion 604 which is via wiring penetrating the second insulating layer 612 and the third insulating layer 613. For example, there is a problem that it is difficult to fill a through-hole with the metal material without generating a cavity.

That is, in order to prevent the deterioration of the thin film resistor, the structure of the multilayer wiring substrate for probe card is complicated, manufacturing of the multilayer wiring substrate is more difficult, and there is a problem that causes an increase in manufacturing cost, a decrease in reliability, or the like.

The present invention has been made in view of the above circumstances, and an object of the present invention is to provide a multilayer wiring substrate for probe card capable of preventing deterioration of a thin film resistor. Another object of the present invention is to provide a highly reliable multilayer wiring substrate for probe card at low cost. Still another object of the present invention is to provide a probe card including such a multilayer wiring substrate.

Solution to Problem

A multilayer wiring substrate for probe card according to a first embodiment of the present invention is a multilayer wiring substrate for probe card, the multilayer wiring substrate being provided on a wiring path between an external terminal and a probe of a probe card, and having a base insulating film formed on a top surface of the multilayer wiring substrate, in which the multilayer wiring substrate includes: a thin film resistor including a thin film formed on the base insulating film and to which a pair of connection electrodes are connected; and an embedded heat sink that is embedded to face the thin film resistor via the base insulating film and includes a material having a thermal conductivity higher than that of the base insulating film, and the embedded heat sink includes a heat dissipating portion that extends outside a region in which the thin film resistor is formed, and is not covered with the base insulating film.

By adopting such a configuration, the heat generated by the thin film resistor is transferred to the embedded heat sink via the base insulating film, and is further released to the outside via the heat dissipating portion of the embedded heat sink that is not covered with the base insulating film. Therefore, the heat is not accumulated in the embedded heat sink, and can be dissipated from the thin film resistor, and the deterioration of the thin film resistor can be prevented.

The multilayer wiring substrate for probe card according to a second embodiment of the present invention further includes a cover insulating film that is formed in a region corresponding to the thin film resistor, covers the thin film resistor, and is formed to expose a part of the base insulating film, and the heat dissipating portion of the embedded heat sink is formed outside a region in which the cover insulating film is formed.

By adopting such a configuration, the cover insulating film is formed in the region corresponding to the thin film resistor, and the heat dissipating portion of the embedded heat sink is formed outside the region in which the cover insulating film is formed. Therefore, it is not necessary to form a through-hole penetrating the cover insulating film, and it has a simple structure and can be easily manufactured. Therefore, the reliability can be improved while suppressing the manufacturing cost.

The multilayer wiring substrate for probe card according to a third embodiment of the present invention includes, in addition to the above configuration, an exposed heat sink that is simultaneously deposited on the heat dissipating portion and a predetermined region on the base insulating film adjacent to the heat dissipating portion and includes a material having a thermal conductivity higher than that of the base insulating film, and the predetermined region of the exposed heat sink is connected to the embedded heat sink via the heat dissipating portion.

By adopting such a configuration, the heat of the embedded heat sink can be efficiently released to the outside via the exposed heat sink having a larger surface area than that of the heat dissipating portion. In addition, since a step difference between the predetermined region and the heat dissipating portion corresponds to a thickness of the base insulating film, step coverage between the predetermined region and the heat dissipating portion can be easily secured when the exposed heat sink is formed.

In the multilayer wiring substrate for probe card according to a fourth embodiment of the present invention, in addition to the above configuration, the exposed heat sink is formed simultaneously with the connection electrodes.

By adopting such a configuration, the connection electrodes and the exposed heat sink are formed in the same manufacturing process, and the exposed heat sink can be formed without complicating the manufacturing process.

The multilayer wiring substrate for probe card according to a fifth embodiment of the present invention includes, in addition to the above configuration, a protective film formed to face the thin film resistor via the cover insulating film, and the exposed heat sink is formed simultaneously with the protective film.

By adopting such a configuration, the protective film and the exposed heat sink are formed in the same manufacturing process, and the exposed heat sink can be formed without complicating the manufacturing process. In addition, by providing the protective film, for example, thermal expansion and contraction of the cover insulating film can be suppressed, or the thin film resistor can be protected from laser light.

In the multilayer wiring substrate for probe card according to a sixth embodiment of the present invention, in addition to the above configuration, the exposed heat sink has a protective region that is a region simultaneously deposited on the heat dissipating portion, on the cover insulating film, and on the predetermined region of the base insulating film adjacent to each of the heat dissipating portion and the cover insulating film, and facing the thin film resistor on the cover insulating film, and the protective region is connected to the embedded heat sink through the predetermined region.

By adopting such a configuration, the heat of the embedded heat sink can be more efficiently released to the outside via the exposed heat sink having a larger surface area. In addition, since a step difference corresponding to the thickness of the base insulating film is formed between the heat dissipating portion and the predetermined region, and a step difference corresponding to a thickness of the cover insulating film is further formed between the predetermined region and the cover insulating film, the exposed heat sink can be easily formed as compared with a case of forming via wiring penetrating the base insulating film and the cover insulating film. In addition, since the exposed heat sink has the protective region, for example, the thermal expansion and contraction of the cover insulating film can be suppressed, or the thin film resistor can be protected from the laser light.

In the multilayer wiring substrate for probe card according to a seventh embodiment of the present invention, in addition to the above configuration, the pair of connection electrodes are provided at both ends in a first direction of the thin film resistor, and the heat dissipating portion is formed in a second direction intersecting the first direction as viewed from the thin film resistor.

In the multilayer wiring substrate for probe card according to an eighth embodiment of the present invention, in addition to the above configuration, two or more of the thin film resistors are aligned separated from each other in the second direction, and the embedded heat sink extends in the second direction and is embedded to face each of the two or more thin film resistors.

By adopting such a configuration, the embedded heat sink can be shared by the two or more thin film resistors, and it is not necessary to provide the heat dissipating portion for each thin film resistor. Therefore, the thin film resistor and the connection electrodes can be arranged at high density, and the probe can be arranged at a narrow pitch.

In the multilayer wiring substrate for probe card according to a ninth embodiment of the present invention, in addition to the above configuration, the base insulating film includes an insulating resin material.

In the multilayer wiring substrate for probe card according to a tenth embodiment of the present invention, in addition to the above configuration, the exposed heat sink includes a metal material formed by a plating method.

A probe card according to an eleventh embodiment of the present invention is configured such that the probe is erected on the multilayer wiring substrate for probe card.

Advantageous Effects of Invention

According to the present invention, it is possible to provide a multilayer wiring substrate for probe card capable of preventing deterioration of a thin film resistor. Further, it is possible to provide a highly reliable multilayer wiring substrate for probe card at low cost. Furthermore, it is possible to provide a probe card including such a multilayer wiring substrate.

DESCRIPTION OF EMBODIMENTS

First Embodiment (1) Probe Card 100

Figure 1:
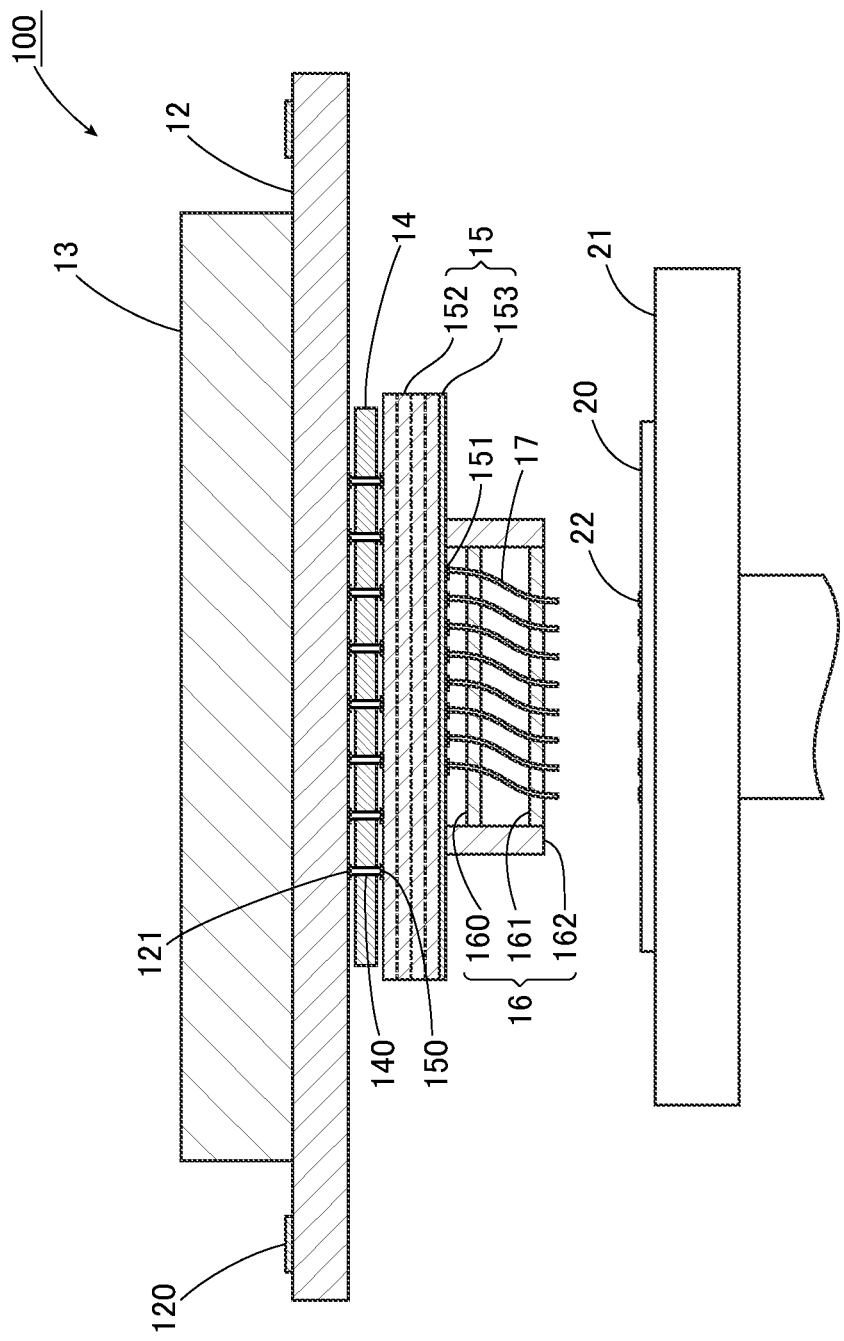
FIG. 1 is a diagram illustrating an example of a schematic configuration of a probe card 100 according to a first embodiment of the present invention.

FIG. 1 is a diagram illustrating an example of a schematic configuration of a probe card 100 according to a first embodiment of the present invention, and illustrates the probe card 100 and a semiconductor wafer 20 placed on a movable stage 21 of a wafer prober and disposed opposite to the probe card 100.

The probe card 100 is an inspection apparatus that performs electrical connection to an inspection object when inspecting electrical characteristics of the inspection object. A large number of electrode pads 22 are formed on the semiconductor wafer 20 as the inspection object, and a large number of probes 17 to be respectively brought into contact with the electrode pads 22 are arranged on a lower surface of the probe card 100 so as to correspond to the electrode pads 22. The illustrated probe card 100 includes a main substrate 12, a reinforcing plate 13, a connection substrate 14, an ST (a space transformer) substrate 15, a support member 16, and two or more probes 17.

The main substrate 12 is a wiring substrate detachably attached to the wafer prober, and for example, a disk-shaped glass epoxy substrate is used therefor. The main substrate 12 is disposed substantially horizontally, and the reinforcing plate 13 is attached to a central portion of an upper surface of the main substrate. The reinforcing plate 13 is a reinforcing member for suppressing distortion of the main substrate 12, and for example, a metal block including stainless steel is used therefor. Two or more external terminals 120 to which signal terminals of a tester (not illustrated) are connected are provided at an outer peripheral edge portion of the upper surface of the main substrate 12, and are connected to a connection terminal 121 provided at a central portion of a lower surface of the main substrate 12.

The connection substrate 14 is an inter-board connecting means disposed between the main substrate 12 and the ST substrate 15 and electrically connecting wiring of the main substrate 12 and wiring of the ST substrate 15, and includes, for example, a large number of pogo pins 140. The pogo pin 140 is an expandable plunger pin penetrating the connection substrate 14 in the vertical direction, and electrically connects the connection terminal 121 of the main substrate 12 and a connection terminal 150 of the ST substrate 15.

The ST substrate 15 is a multilayer wiring substrate that converts an electrode pitch, and is disposed on the lower surface side of the main substrate 12. The connection terminal 150 is provided on an upper surface of the ST substrate 15, and two or more electrode pads 151 for probe are provided on a lower surface of the ST substrate 15. The electrode pad 151 for probe is an electrode to which the probe 17 is connected, and is disposed at a pitch corresponding to the probe 17. In addition, the electrode pad 151 for probe is electrically connected to the connection terminal 150 disposed at a wider pitch via a wiring circuit in the ST substrate 15, and is further electrically connected to the external terminal 120 of the main substrate 12 disposed at a wider pitch via the pogo pin 140 and the connection terminal 121.

The ST substrate 15 includes a ceramic substrate 152 and a laminated structure 153. Since ceramic is less likely to be distorted than glass epoxy or the like, distortion of the ST substrate 15 can be suppressed by using the ceramic substrate 152. In addition, the ceramic substrate 152 may be a single ceramic plate, but occurrence of distortion can be further suppressed by using a laminated plate obtained by bonding two or more ceramic plates.

The laminated structure 153 is formed by laminating two or more insulating layers on a lower surface of the ceramic substrate 152. For each insulating layer, for example, a synthetic resin containing polyimide as a main component is used. A wiring pattern is formed between adjacent insulating layers, and wiring patterns are connected to each other via a via wiring penetrating the insulating layer to constitute a wiring circuit that electrically connects the connection terminal 150 and the electrode pad 151 for probe.

The support member 16 includes one or more guide plates 160 and 161 that guide the probe 17, and a spacer 162 that fixes the guide plates 160 and 161 to the ST substrate 15. A large number of through-holes (not illustrated) through which the probes 17 are inserted are formed in the guide plates 160 and 161, and a tip of the probe 17 is vertically movably supported by the guide plates.

The probe 17 is a vertical probe having an elongated shape and includes a conductive material. An upper end of the probe 17 is disposed to be in contact with the electrode pad 151 for probe. In addition, a lower end of the probe 17 comes into contact with the electrode pad 22 on the semiconductor wafer 20 by bringing the semiconductor wafer 20 close to the probe card 100.

(2) ST Substrate 15

Figure 2:
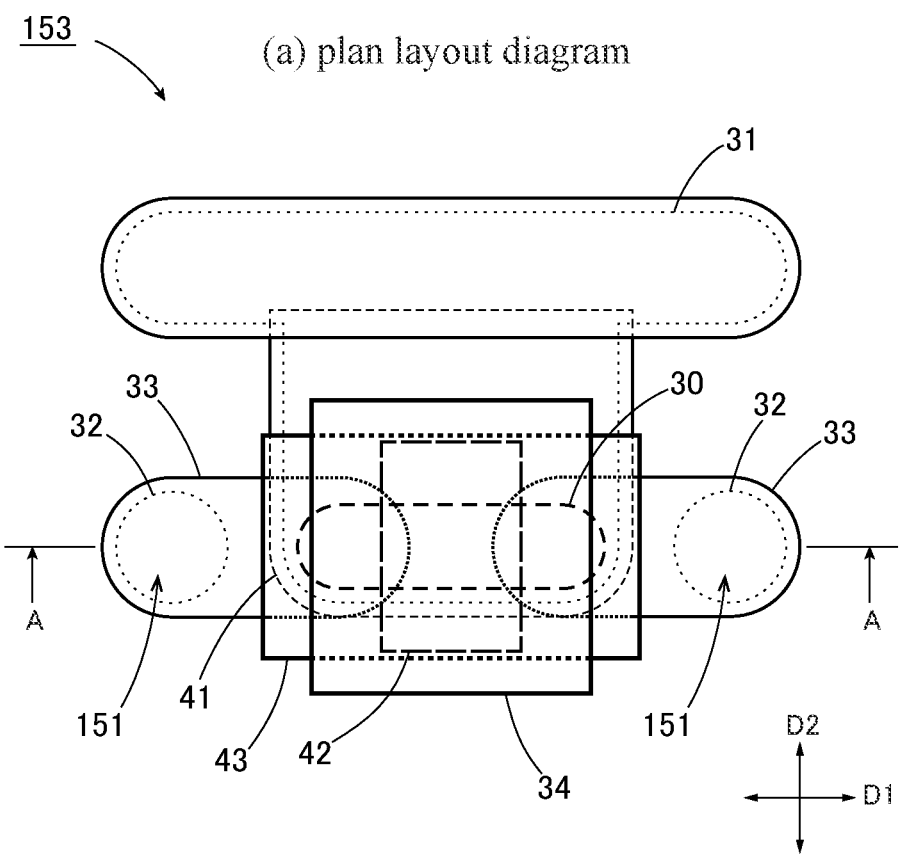
FIG. 2 is a diagram illustrating a configuration example of a main part of the ST substrate of FIG. 1.
Figure 2:
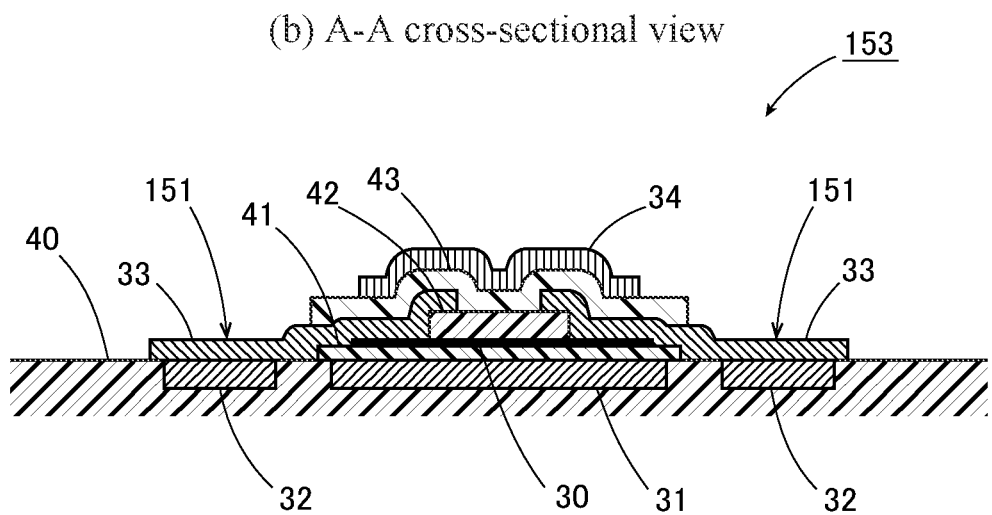
Figure 3:
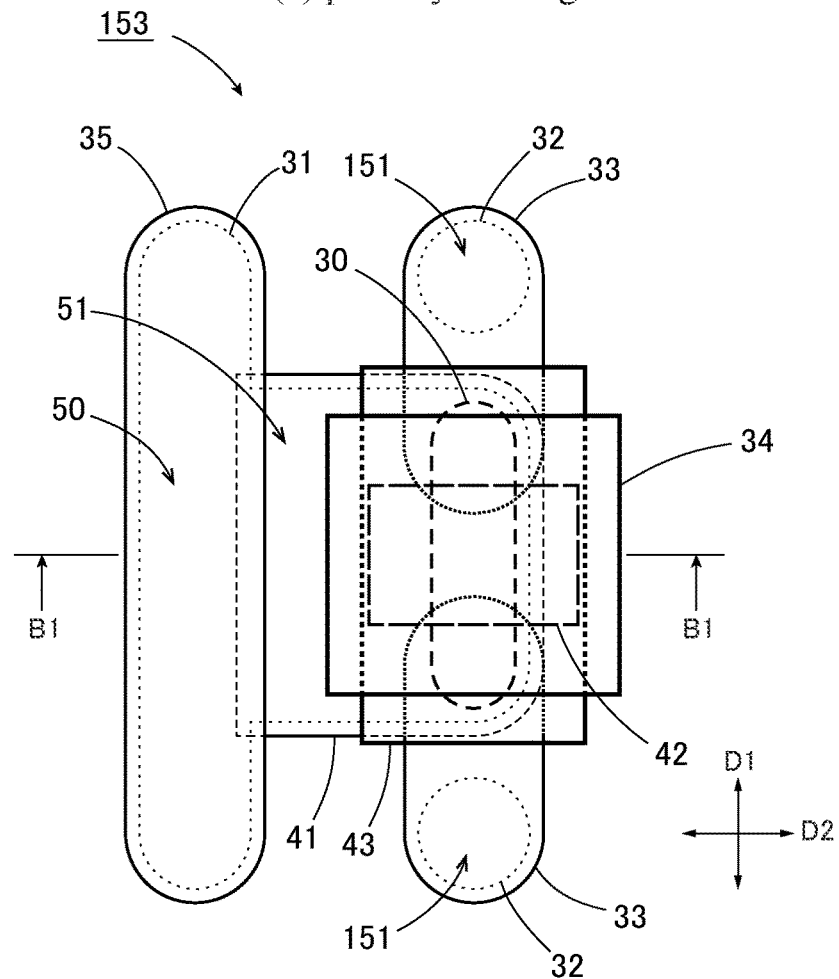
FIG. 3 is a diagram illustrating a configuration example of a main part of the ST substrate of FIG. 1.
Figure 3:
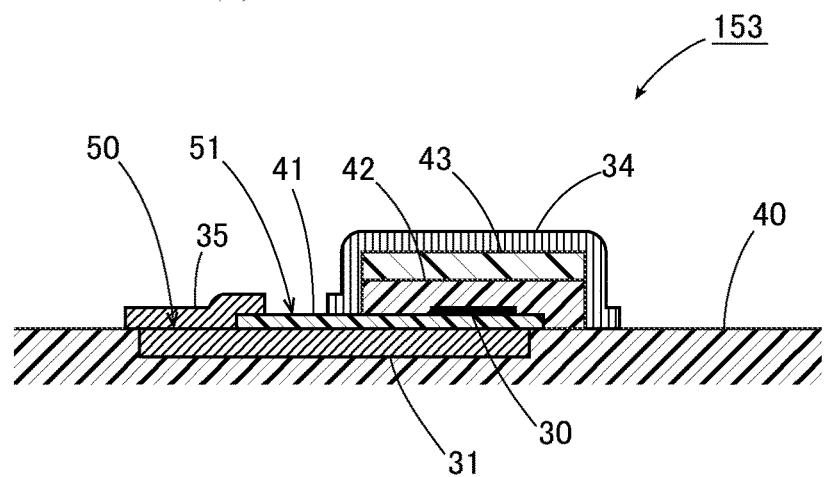

FIGS. 2 and 3 are diagrams illustrating a configuration example of a main part of the ST substrate 15 of FIG. 1. These figures illustrate a state in which the ST substrate 15 in FIG. 1 is vertically inverted. Therefore, in the following description on the ST substrate 15, the lower side in FIG. 1 is described as the upper side. Further, in these figures, only a part of the upper surface side of the laminated structure 153 constituting the ST substrate 15 is illustrated, and the other part of the laminated structure 153 and the ceramic substrate 152 located below are omitted. Further, a first direction D1 and a second direction D2 are both parallel to a main surface of the ST substrate and perpendicular to each other. Note that the first direction D1 and the second direction D2 may not be perpendicular to each other as long as the first direction D1 and the second direction D2 intersect each other.

FIG. 2(a) is a plan layout diagram illustrating a layout of components when the ST substrate 15 is viewed in a plan view, and FIG. 2(b) is a cross-sectional view (an A-A cross-sectional view) illustrating a cross-section taken along a cutting line A-A in FIG. 2(a). The cutting line A-A is a straight line extending in the first direction D1 and passing through a thin film resistor 30 and a pair of connection electrodes 33. Hereinafter, description will be made mainly with reference to FIG. 2(b).

An insulating film 40 is formed on the entire surface of the ST substrate 15, whereas insulating films 41 to 43 are formed in a region corresponding to the thin film resistor 30. The insulating films 40 to 43 are all layers including an insulating material, and is formed, for example, by applying a synthetic resin containing polyimide as a main component, thermally curing the synthetic resin, and then performing patterning using a photolithography technique. Note that for the insulating film 40 to 43, other insulating materials can be used, and insulating materials different from each other can also be used.

The thin film resistor 30 is a resistance element formed as a thin film on a base insulating film 41, includes a conductive metal material having a predetermined resistivity, for example, a nickel-chromium (Ni—Cr) alloy, and has a lower linear expansion coefficient and a higher thermal conductivity than those of the insulating film 40 to 43. The thin film resistor 30 is formed in an elongated region whose longitudinal direction is the first direction D1, and the pair of connection electrodes 33 are formed near both ends in the longitudinal direction.

An embedded heat sink 31 is a heat dissipation member disposed to face the thin film resistor 30 via the base insulating film 41, includes, for example, a metal material such as copper (Cu), and has a lower linear expansion coefficient and a higher thermal conductivity than those of the insulating film 40 to 43. The embedded heat sink 31 is embedded in a lower layer insulating film 40 constituting the laminated structure 153. A recess is formed on an upper surface of the lower layer insulating film 40, and the embedded heat sink 31 is formed in the recess with the upper surface exposed from the lower layer insulating film 40.

A pair of wiring electrodes 32 is a part of the wiring circuit in the ST substrate 15, and a low-resistance conductive metal material such as copper (Cu) is used therefor. The wiring electrodes 32 are embedded in the lower layer insulating film 40 away from the embedded heat sink 31. That is, similarly to the embedded heat sink 31, the wiring electrodes 32 are formed in the recess of the lower layer insulating film 40 with the upper surface exposed from the lower layer insulating film 40, and are separated from the embedded heat sink 31 with the lower layer insulating film 40 interposed therebetween. In addition, the wiring electrodes 32 are electrically connected to the connection terminal 150 via a wiring pattern or via wiring (not illustrated).

The pair of connection electrodes 33 is connection means for connecting both ends of the thin film resistor 30 respectively to the pair of wiring electrodes 32, and a low-resistance conductive metal material such as copper (Cu) is used therefor. The connection electrode 33 has a shape extending in the first direction D1, has one end side formed on the thin film resistor 30 and the other end side formed on the wiring electrode 32, and passes on the base insulating film 41 and the lower layer insulating film 40 to electrically connect the thin film resistor 30 and the wiring electrode 32.

A protective film 34 is a thin film for suppressing thermal stress generated in the thin film resistor 30 or protecting the thin film resistor 30 from laser light, and is formed on a cover insulating film 43 so as to face the thin film resistor 30. The protective film 34 includes a metal material having a thermal expansion coefficient lower than that of the cover insulating film 43 and having good light reflection characteristics, for example, gold (Au) or nickel (Ni), and is formed in a region corresponding to the thin film resistor 30, to substantially cover the thin film resistor By providing such a protective film 34, thermal expansion and contraction of the cover insulating film 43 can be suppressed, and deterioration of the thin film resistor 30 due to the thermal stress can be suppressed. In addition, when the laser light is irradiated for bonding the probe 17 to the electrode pad 151 for probe, it is possible to prevent the thin film resistor 30 from being damaged by the irradiated laser light.

The base insulating film 41 is formed to cover the embedded heat sink 31 immediately below the thin film resistor 30 and in a peripheral region of the thin film resistor 30, and insulates the embedded heat sink 31 from the thin film resistor 30 and the connection electrode 33.

A separation insulating film 42 is an insulating film that defines an effective length of the thin film resistor 30, and is formed on the thin film resistor 30. The separation insulating film 42 extends in the second direction D2 so as to cross the vicinity of the center in the longitudinal direction of the thin film resistor 30, and the pair of connection electrodes 33 are arranged such that one ends of the connection electrodes ride on the separation insulating film 42 and are separated from each other on the separation insulating film 42. Therefore, a width of the separation insulating film 42 in the first direction D1 is the effective length of the thin film resistor and a resistance value of the thin film resistor 30 is defined by a shape of the separation insulating film 42.

The cover insulating film 43 is an insulating film that covers the thin film resistor 30, and is formed in a region corresponding to the thin film resistor 30, for example, a region in which the thin film resistor 30 is formed and a peripheral region of the thin film resistor 30. The cover insulating film 43 is formed on the connection electrode 33, the base insulating film 41, and the separation insulating film 42, a part of the connection electrode 33 is covered with the cover insulating film 43, and the other region is exposed from the cover insulating film 43 and can be used as the electrode pad 151 for probe. The thin film resistor 30 and the separation insulating film 42 are completely covered with the cover insulating film 43.

FIG. 3(a) is a plan layout diagram illustrating the same plan layout as that of FIG. 2(a) rotated by 90°, and FIG. 3(b) is a cross-sectional view (a B1-B1 cross-sectional view) illustrating a cross-section taken along a cutting line B1-B1 in FIG. 3(a). The cutting line B1-B1 is a straight line extending in the second direction D2 and passing through the thin film resistor 30 and the exposed heat sink 35.

The heat dissipating portion 50 is a region of the embedded heat sink 31 that is not covered with the base insulating film 41. The embedded heat sink 31 faces the thin film resistor 30, extends in the second direction D2 outside the region in which the thin film resistor 30 is formed, and is exposed from the base insulating film 41 in the heat dissipating portion 50 separated from the thin film resistor 30.

An exposed region 51 is a region of the base insulating film 41 that is not covered with the cover insulating film 43. The base insulating film 41 is formed corresponding to the embedded heat sink 31, faces the thin film resistor 30, extends in the second direction D2 outside the region in which the thin film resistor 30 is formed, and is exposed from the cover insulating film 43 in the exposed region 51 separated from the thin film resistor 30.

That is, the base insulating film 41 extends in the second direction D2 so as to intersect an edge portion of the cover insulating film 43, and the exposed region 51 is formed outside a region in which the cover insulating film 43 is formed. In addition, the embedded heat sink 31 further extends in the second direction D2 so as to intersect an edge portion of the base insulating film 41, and the heat dissipating portion 50 is formed outside a region where the base insulating film 41 is formed. Therefore, the heat dissipating portion 50 is formed away from the cover insulating film 43, and the exposed region 51 is a region adjacent to each of the cover insulating film 43 and the heat dissipating portion 50. A step is formed at a boundary between the heat dissipating portion 50 and the exposed region 51, and a height of the step corresponds to a thickness of the base insulating film 41. In addition, the heat dissipating portion 50 is adjacent to the upper surface of the lower layer insulating film 40 on a side opposite to the exposed region 51, and at the boundary, a step smaller than the step with the exposed region 51 is formed, or a step is not formed and is flat.

The exposed heat sink 35 is a heat dissipation member connected to the embedded heat sink 31, and may include a material having a higher thermal conductivity than the insulating film 40 to 43, for example, a metal material such as copper (Cu), gold (Au), or nickel (Ni). The exposed heat sink 35 is formed on the heat dissipating portion 50, and is also formed on the exposed region 51 adjacent to the heat dissipating portion 50 and on the lower layer insulating film That is, the exposed heat sink 35 includes the heat dissipating portion 50 and is formed in a region larger than the heat dissipating portion 50. Therefore, a heat dissipating surface having a larger surface area than the heat dissipating portion 50 can be secured, and higher heat dissipation efficiency can be secured as compared with a case where the exposed heat sink 35 is not provided. In addition, since no step is formed or only a small step is formed on an outer edge of the heat dissipating portion 50, it is possible to easily form the exposed heat sink 35 having a larger area than the heat dissipating portion 50 while securing step coverage. By providing the heat dissipating portion 50 outside the region in which the cover insulating film 43 is formed, the heat dissipating portion can be disposed sufficiently away from the thin film resistor 30 that is a heat source, so that heat dissipation efficiency can be improved. Further, since the exposed heat sink can be formed simultaneously with the connection electrode 33 or the protective film 34, it is possible to form the exposed heat sink without complicating a manufacturing process.

(3) Manufacturing Method

Figure 4:
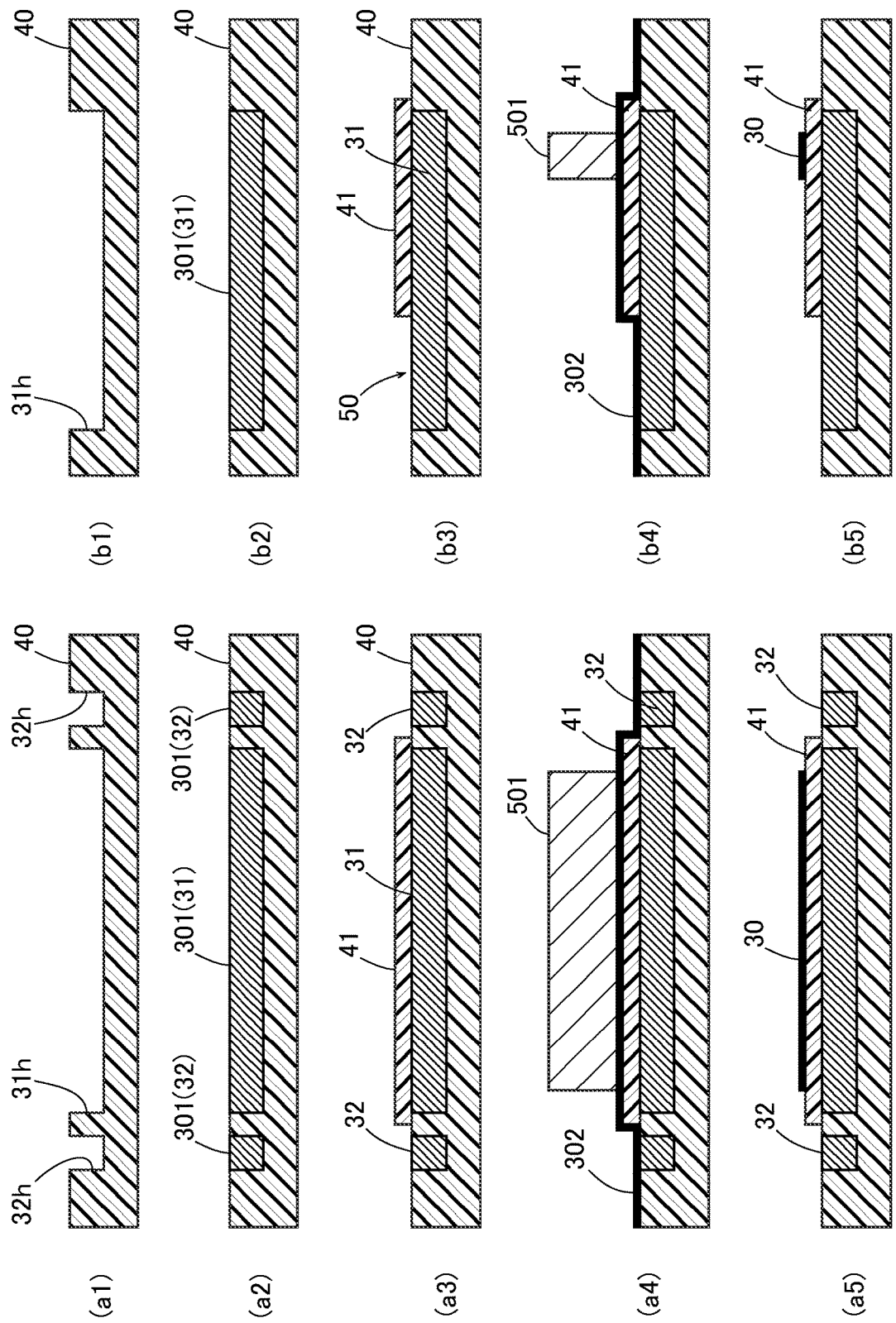
FIG. 4 is a diagram schematically illustrating an example of a method for manufacturing the ST substrate 15 in FIG. 1.
Figure 5:
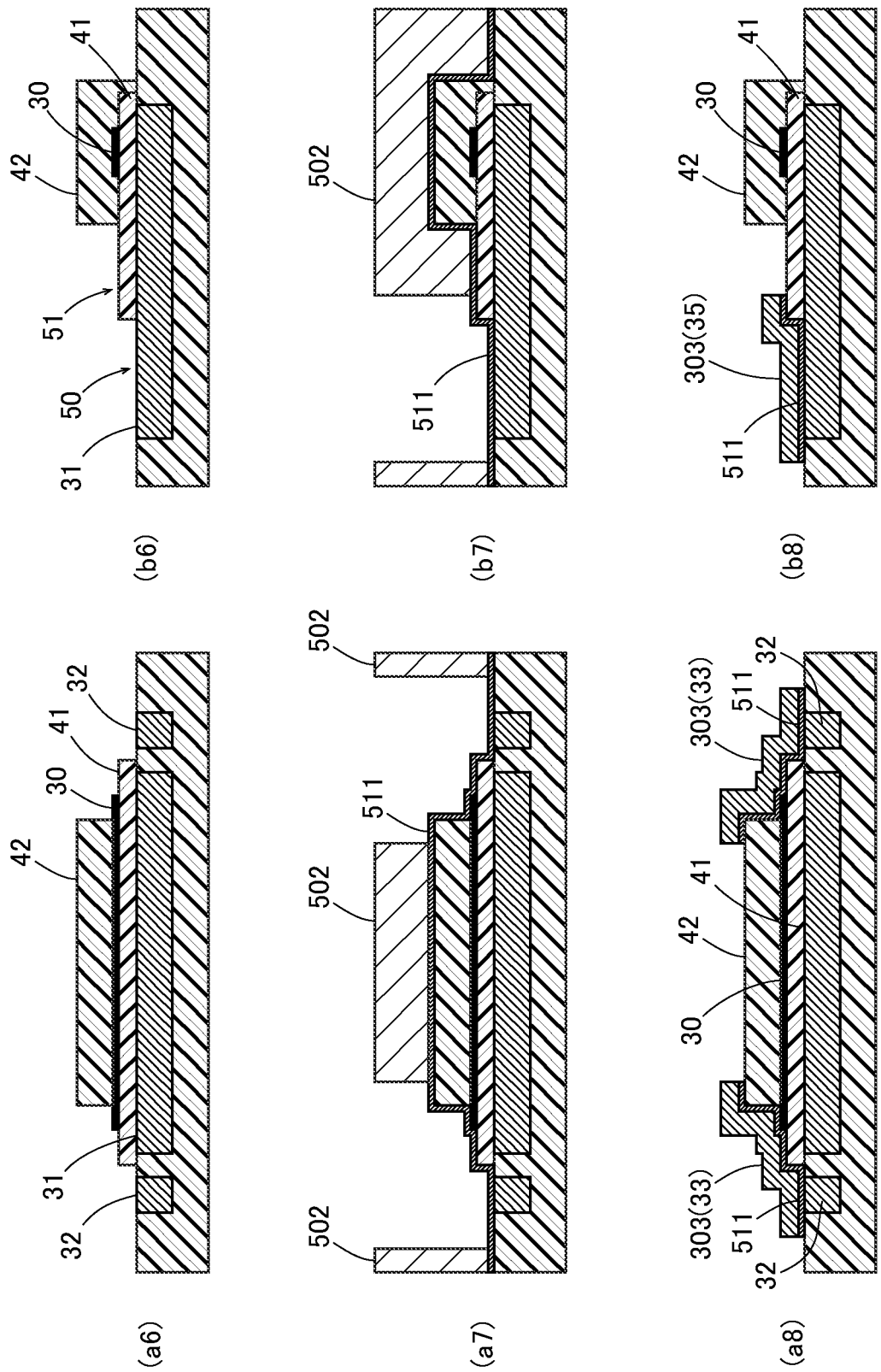
FIG. 5 is a diagram schematically illustrating an example of a method for manufacturing the ST substrate 15 in FIG. 1.
Figure 6:
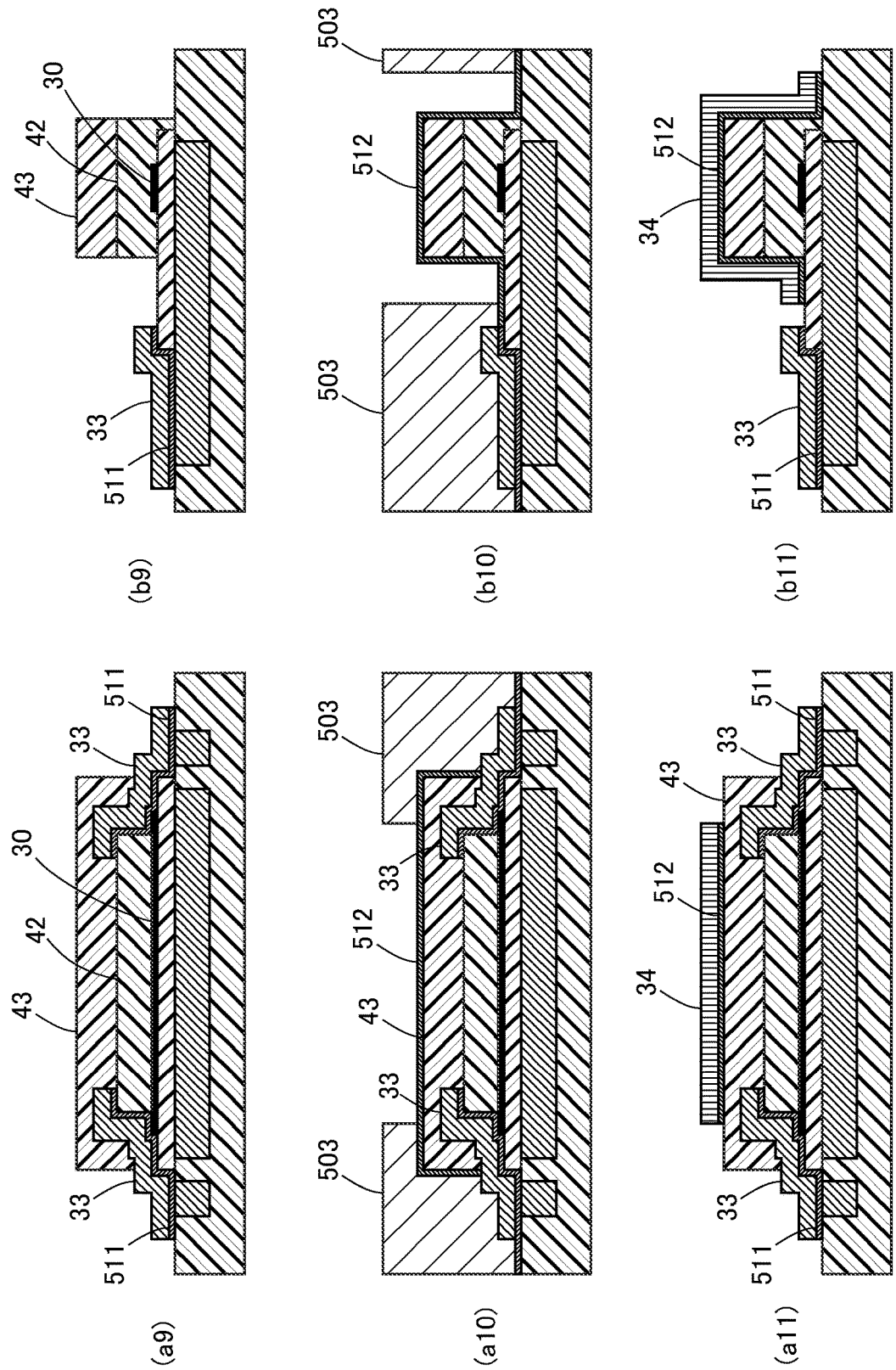
FIG. 6 is a diagram schematically illustrating an example of a method for manufacturing the ST substrate 15 in FIG. 1.

FIGS. 4 to 6 are diagrams schematically illustrating an example of a method for manufacturing the ST substrate 15 in FIG. 1. (a1) to (a11) in the figures are diagrams illustrating the cross-section taken along the cutting line A-A in FIG. 2(a) in the manufacturing process, (b1) to (b11) in the figures are diagrams illustrating the cross-section taken along the cutting line B1-B1 in FIG. 3(a) in the manufacturing process, and a11 illustrate states in the manufacturing process in time series.

(a1) and (b1) illustrate recesses 31h and 32h are formed on the upper surface of the lower layer insulating film 40. The recesses 31h and 32h are formed using the photolithography technique after the lower layer insulating film 40 is formed. The recess 31h is a groove corresponding to the embedded heat sink 31, the recess 32h is a groove corresponding to the wiring electrode 32, and the grooves are formed as grooves separated from each other.

(a2) and (b2) illustrate a state in which a wiring material such as copper (Cu) is deposited on the lower layer insulating film 40, and then a surface thereof is polished to be flat. A wiring material 301 is embedded in the recesses 31$h$ and 32$h$, and the embedded heat sink 31 and the wiring electrode 32 are simultaneously formed. The upper surfaces of the embedded heat sink 31 and the wiring electrode 32 are aligned with the upper surface of the lower layer insulating film and are exposed from the lower layer insulating film 40.

(a3) and (b3) illustrate a state in which the base insulating film 41 is formed. The base insulating film 41 is formed on the entire surface of the substrate and then patterned using the photolithography technique. The base insulating film 41 is formed to cover the embedded heat sink 31 in a region corresponding to the thin film resistor 30 and the connection electrode 33, but is not formed on the heat dissipating portion 50 separated from the thin film resistor 30 in the second direction D2, and exposes the embedded heat sink 31.

(a4) and (b4) illustrate a state in which a resistance thin film 302 and a photoresist 501 are formed, and (a5) and (b5) illustrate a state in which the thin film resistor 30 is formed. The thin film resistor 30 is obtained by patterning the resistance thin film 302 using the photoresist 501. The resistance thin film 302 is a thin film formed on the entire surface of the substrate, and is formed by depositing, for example, a nickel-chromium (Ni—Cr) alloy. Further, the photoresist 501 is formed on the thin film resistor 30, and is patterned to open outside the region in which the thin film resistor 30 is formed. Thereafter, the exposed resistance thin film 302 is removed by etching processing, and the photoresist 501 is further removed, so that the thin film resistor 30 is formed on the base insulating film 41.

(a6) and (b6) illustrate a state in which the separation insulating film 42 is formed. The separation insulating film 42 is formed on the entire surface of the substrate and then patterned using the photolithography technique. The separation insulating film 42 extends in the second direction D2 so as to cross the thin film resistor 30, and is formed to leave both ends of the thin film resistor 30 in the first direction D1.

(a7) and (b7) illustrate a state in which a seed film 511 and a photoresist 502 are formed. The seed film 511 is a base film for forming the connection electrode 33 and the exposed heat sink by a plating method, and for example, thin films of titanium (Ti) and copper (Cu) are formed on the entire surface of the substrate by a sputtering method. The photoresist 502 is formed on the seed film 511, and is patterned to open regions in which the connection electrode 33 and the exposed heat sink 35 are formed.

(a8) and (b8) illustrate a state in which the connection electrode 33 and the exposed heat sink 35 are formed. The connection electrode 33 and the exposed heat sink 35 are formed by, for example, depositing copper (Cu) in an opening of the photoresist 502 and then removing the photoresist 502 and the seed film 511. That is, the exposed heat sink 35 is simultaneously formed in the same process as the connection electrode 33, and the exposed heat sink 35 can be formed without increasing the number of processes.

(a9) and (b9) illustrate a state in which the cover insulating film 43 is formed. The cover insulating film 43 is formed on the entire surface of the substrate and then patterned using the photolithography technique. The cover insulating film 43 is formed to cover the thin film resistor 30.

(a10) and (b10) illustrate a state in which a seed film 512 and the photoresist 503 are formed. The seed film 512 is a base film for forming the protective film 34 by the plating method, and for example, the thin films of titanium (Ti) and copper (Cu) are formed by the sputtering method. The photoresist 503 is formed on the seed film 512, and is patterned to open a region in which the protective film 34 is formed.

(a11) and (b11) illustrate a state in which the protective film 34 is formed. The protective film 34 is formed by, for example, depositing gold (Au), nickel (Ni), or the like in an opening of the photoresist 503 and then removing the photoresist 503 and the seed film 512.

Since the base insulating film 41 is formed on the planarized lower layer insulating film 40, it is formed as a relatively thin layer, for example, a layer having a thickness of 5 μm. On the other hand, the separation insulating film 42 is formed to have a thickness of, for example, 10 to 15 μm, and the connection electrode 33 is formed to have a thickness of, for example, 10 μm. Moreover, since the connection electrode 33 is formed to overlap the base insulating film 41, the thin film resistor 30, and the separation insulating film 42, large irregularities are formed on the upper surface of the substrate after formation of the connection electrode 33. Therefore, the cover insulating film 43 formed thereon is formed as a relatively thick layer in order to ensure coverage, and has a thickness of, for example, 20 μm or more. Therefore, if a through-hole is to be formed in the cover insulating film 43 as in a conventional technique, manufacturing cost increases or reliability decreases. In contrast, by drawing the embedded heat sink 31 out of the region in which the cover insulating film 43 is formed and providing the heat dissipating portion 50 that is not covered with the base insulating film 41, the manufacturing process can be simplified.

Note that although an example in which the exposed heat sink 35 is formed simultaneously with the connection electrode 33 has been described here, the exposed heat sink can be simultaneously formed in the same process as the protective film 34.

(4) Modification

Figure 7:
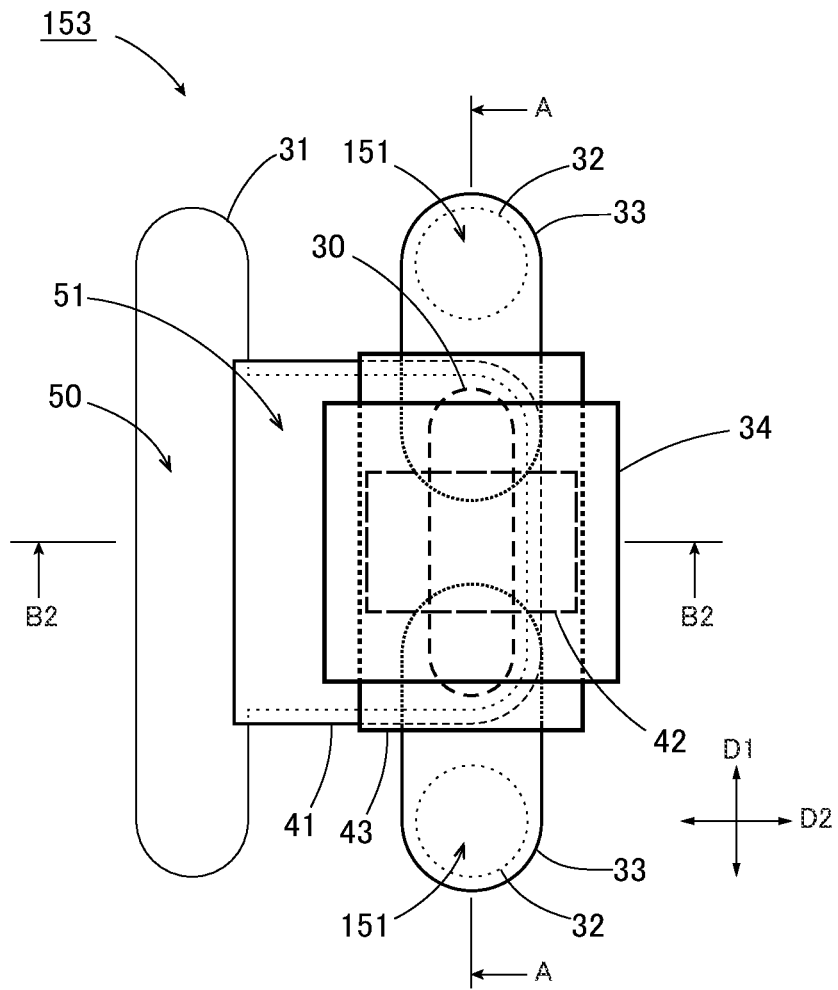
FIG. 7 is a diagram illustrating another configuration example of the main part of the ST substrate 15 of FIG. 1.
Figure 7:
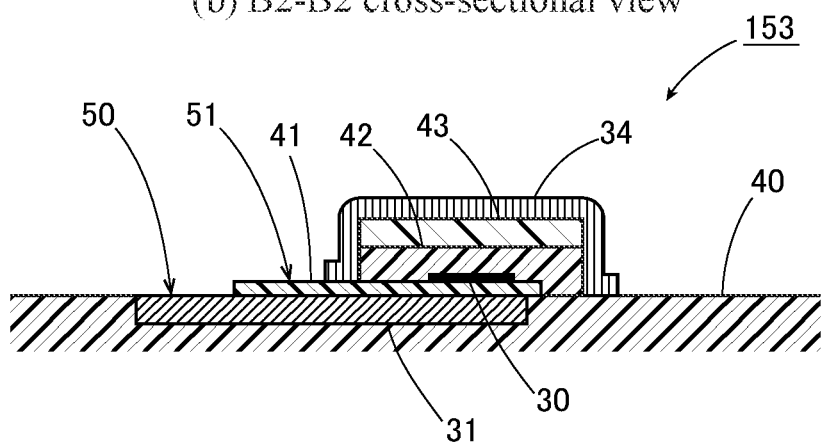

FIG. 7 is a diagram illustrating another configuration example of the main part of the ST substrate 15 of FIG. 1. FIG. 7($a$) is a plan layout diagram illustrating a layout of components when the ST substrate 15 is viewed in a plan view, and FIG. 7($b$) is a cross-sectional view (a B2-B2 cross-sectional view) illustrating a cross-section taken along a cutting line B2-B2 in FIG. 7($a$). The cutting line B2-B2 is a straight line extending in the second direction D2 through the thin film resistor 30. Note that the cutting surface A-A is the same as that in FIG. 2($b$), and thus redundant description will be omitted.

The ST substrate 15 is different from the ST substrate 15 illustrated in FIG. 3 in that the exposed heat sink 35 is not provided, the heat dissipating portion 50 of the embedded heat sink 31 is exposed to atmosphere, and heat of the embedded heat sink 31 is directly discharged from the heat dissipating portion 50 to the atmosphere without through the exposed heat sink 35.

Second Embodiment

In the first embodiment, the ST substrate 15 in which the exposed heat sink 35 and the protective film 34 are formed to be separated from each other has been described. In contrast, in the present exemplary embodiment, the ST substrate 15 in which a part of the exposed heat sink 35 functions as the protective film 34 will be described.

Figure 8:
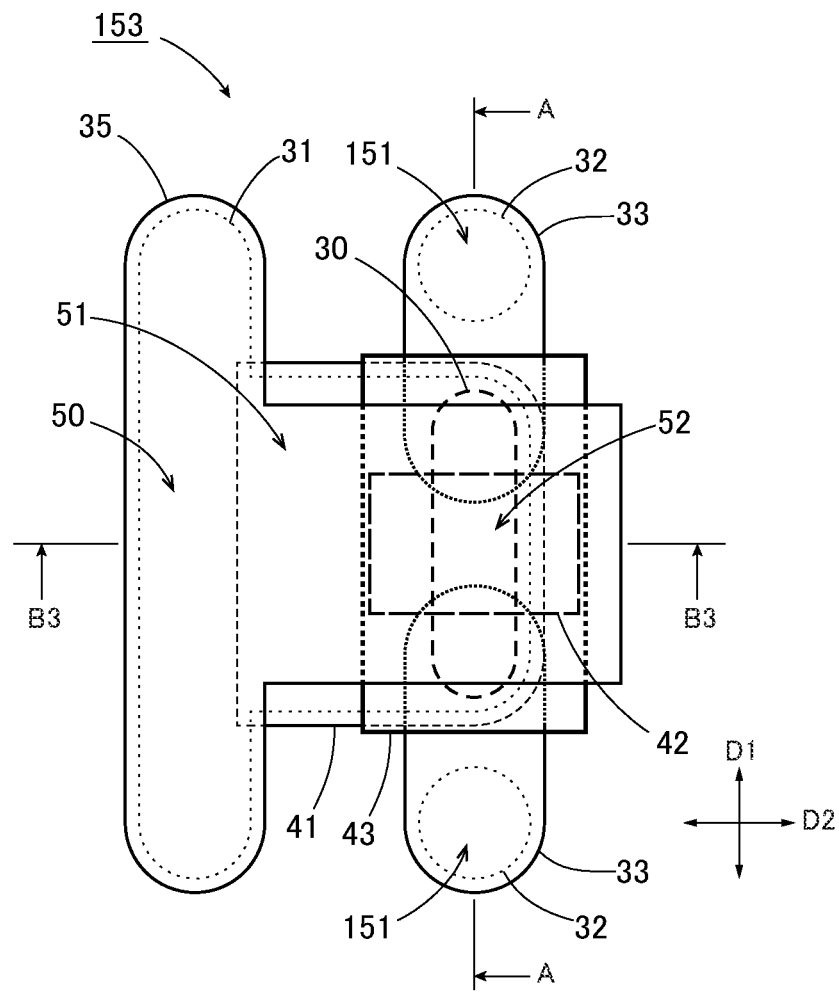
FIG. 8 is a diagram illustrating a configuration example of the main part of the ST substrate 15 according to a second embodiment of the present invention.
Figure 8:
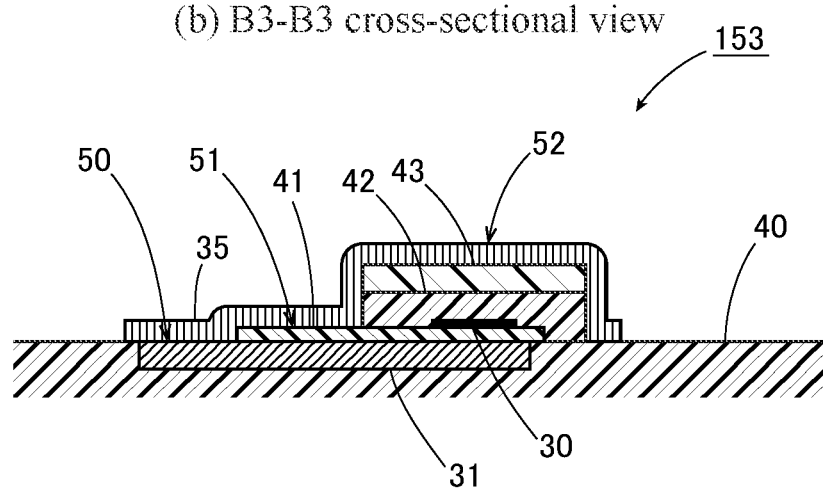

FIG. 8 is a diagram illustrating a configuration example of the main part of the ST substrate 15 according to a second embodiment of the present invention. FIG. 8(a) is a plan layout diagram illustrating a layout of components when the ST substrate 15 is viewed in a plan view, and FIG. 8(b) is a cross-sectional view (a B3-B3 cross-sectional view) illustrating a cross-section taken along a cutting line B3-B3 in FIG. 8(a). The cutting line B3-B3 is a straight line extending in the second direction D2 through the thin film resistor 30. Note that the cutting surface A-A is the same as that in FIG. 2(b), and thus redundant description will be omitted.

The ST substrate 15 is different from the ST substrate 15 illustrated in FIG. 3 (the first embodiment) in that the exposed heat sink 35 extends to a region of the protective film 34, has a protective region 52 facing thin film resistor 30, and the protective region 52 protects thin film resistor 30 from the thermal stress or the laser light. That is, it is different from the structure of ST substrate 15 in FIG. 3 in that the exposed heat sink 35 integrated with the protective film 34 is provided, and the surface area is larger than that of the ST substrate 15 in FIG. 3.

The exposed heat sink 35 functions as a heat dissipation means for the thin film resistor and also functions as a protective means for the thin film resistor 30. Therefore, a metal material having a lower thermal expansion coefficient and a higher thermal conductivity than the insulating films 40 to 43 and having good light reflection characteristics, for example, gold (Au) or nickel (Ni) is used, and the exposed heat sink 35 is formed by the same process as the protective film 34.

The exposed heat sink 35 is formed on the heat dissipating portion 50, the exposed region 51, and the lower layer insulating film 40, is also formed on the cover insulating film 43, and has the protective region 52 facing the thin film resistor 30 via the cover insulating film 43. The protective region 52 is formed to substantially cover the thin film resistor 30, and protects the thin film resistor 30 from the thermal stress by suppressing the thermal expansion and contraction of the cover insulating film 43, or protects the thin film resistor 30 from the laser light emitted for bonding the probe 17 to the electrode pad 151 for probe.

The exposed heat sink 35 includes the heat dissipating portion 50 and is formed in the region larger than the heat dissipating portion 50. In particular, the exposed heat sink 35 can be formed in a larger region than the exposed heat sink 35 illustrated in FIG. 3 (embodiment 1) by being extended onto the cover insulating film 43. Therefore, it is possible to secure the heat dissipating surface having a large surface area, and to secure higher heat dissipation efficiency.

Figure 12:
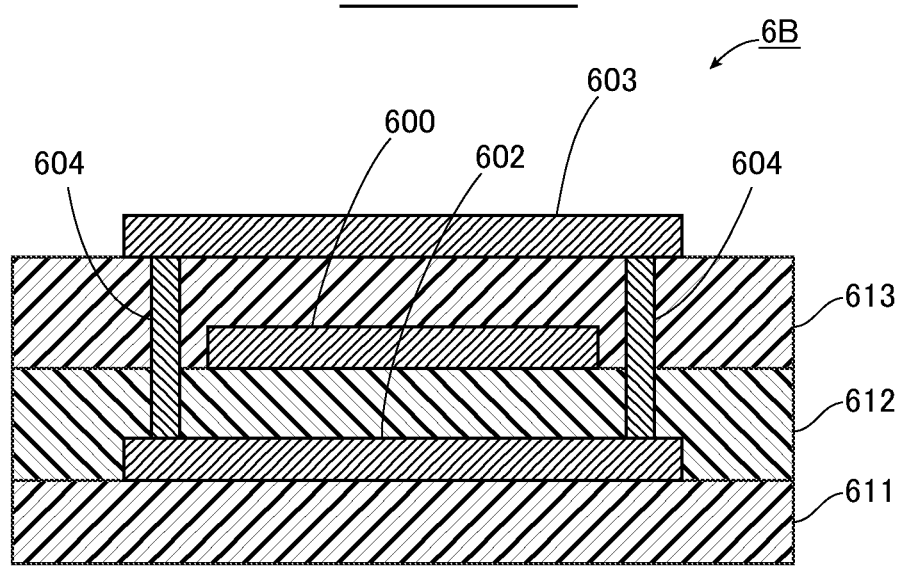
FIG. 12 is an explanatory diagram schematically illustrating a main part of a conventional multilayer wiring substrate 6B for probe card.

Further, the exposed region 51 is adjacent to each of the heat dissipating portion 50 and the cover insulating film 43. Therefore, the step is formed at the boundary between the heat dissipating portion 50 and the exposed region 51, the height of the step corresponds to the thickness of the base insulating film 41, a step is also formed at a boundary between the exposed region 51 and the cover insulating film 43, and a height of the step corresponds to a thickness of the cover insulating film 43. Therefore, as compared with the conventional technique in which the via wiring that penetrates both the base insulating film 41 and the cover insulating film 43 corresponding to the second insulating film 612 and the third insulating film 613 in FIG. 12 needs to be formed, it is possible to easily form the exposed heat sink 35 having a large area while ensuring the step coverage. Furthermore, since the ST substrate 15 includes the exposed heat sink having the protective region 52 instead of the protective film 34, it can be manufactured without complicating the manufacturing process as compared with the ST substrate 15 having the protective film 34.

Third Embodiment

In the above embodiment, an example in which the embedded heat sink 31, the heat dissipating portion 50, and the exposed heat sink 35 are provided for each thin film resistor 30 has been described. In contrast, in the present embodiment, a case where two or more thin film resistors 30a to 30c share the embedded heat sink 31, the heat dissipating portion 50, and the exposed heat sink 35 will be described.

Figure 9:
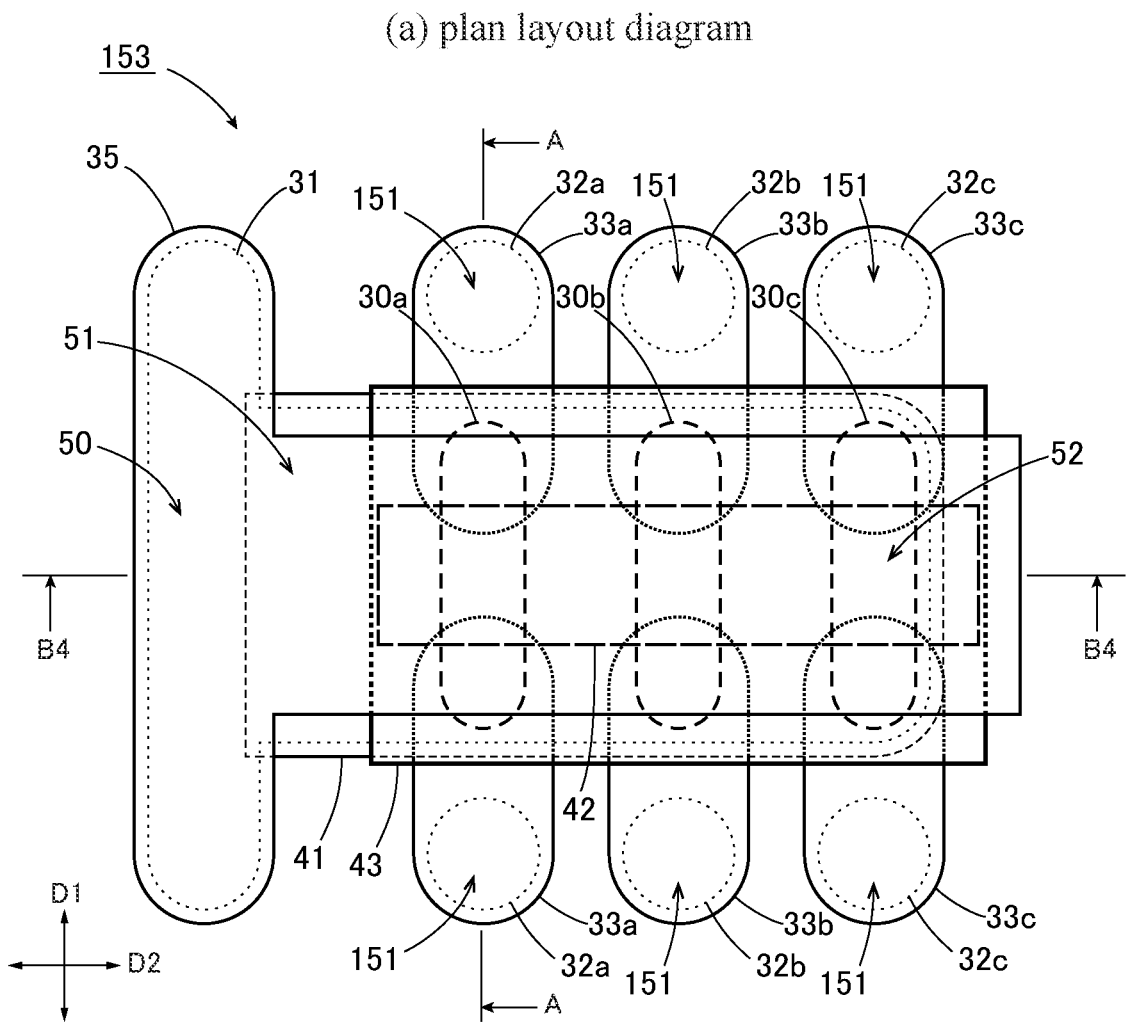
FIG. 9 is a diagram illustrating a configuration example of the main part of the ST substrate 15 according to a third embodiment of the present invention.
Figure 9:
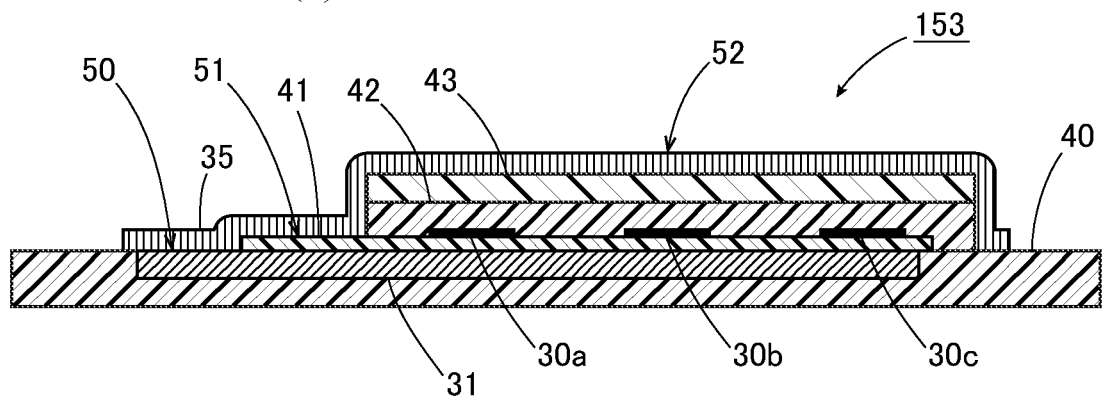

FIG. 9 is a diagram illustrating a configuration example of the main part of the ST substrate 15 according to a third embodiment of the present invention. FIG. 9(a) is a plan layout diagram illustrating a layout of components when the ST substrate 15 is viewed in a plan view, and FIG. 9(b) is a cross-sectional view (a B4-B4 cross-sectional view) illustrating a cross-section taken along a cutting line B4-B4 in FIG. 9(a). The cutting line B4-B4 is a straight line extending in the second direction D2 through the thin film resistor 30. Note that the cutting surface A-A is the same as that in FIG. 2(b), and thus redundant description will be omitted.

The ST substrate 15 is different from the ST substrate 15 illustrated in FIG. 8 (the second embodiment) in that the embedded heat sink 31, the heat dissipating portion 50, and exposed heat sink 35 that are common to the two or more thin film resistors 30a to 30c are provided.

The two or more thin film resistors 30a to 30c are aligned in the second direction D2 at equal intervals. The two or more thin film resistors 30a to 30c are respectively provided with pair of wiring electrodes 32a to 32c and pair of connection electrodes 33a to 33c, and are commonly provided with the insulating films 41 to 43, the embedded heat sink 31, the exposed heat sink 35, and the heat dissipating portion 50.

That is, the two or more thin film resistors 30a to 30c are formed on a common base insulating film 41 and face a common embedded heat sink 31 via the base insulating film 41. Further, on the two or more thin film resistors 30, a common separation insulating film 42 is formed, and a common cover insulating film 43 is further formed. Further, a common heat dissipating portion 50 and the exposed region 51 are formed outside the thin film resistor 30a on one end side, and a common exposed heat sink 35 is connected to the embedded heat sink 31 via the heat dissipating portion 50. The exposed heat sink 35 faces each of the two or more thin film resistors 30a to 30c.

By sharing the embedded heat sink 31 for the two or more thin film resistors 30a to 30c, the heat dissipating portion 50 can also be shared. Therefore, it is not necessary to provide the heat dissipating portion 50 for each thin film resistor 30, and the thin film resistor 30 and the connection electrode 33 can be arranged at high density, and the electrode pads 151 for probe can be arranged at a narrow pitch.

Fourth Embodiment

In the above embodiment, an example in which the heat dissipating portion 50 and the exposed heat sink 35 are formed on one side of the thin film resistor 30 has been described. In contrast, in the present embodiment, a case where the heat dissipating portions 50 and the exposed heat sinks 35 are respectively formed on both sides of the thin film resistor 30 will be described.

Figure 10:
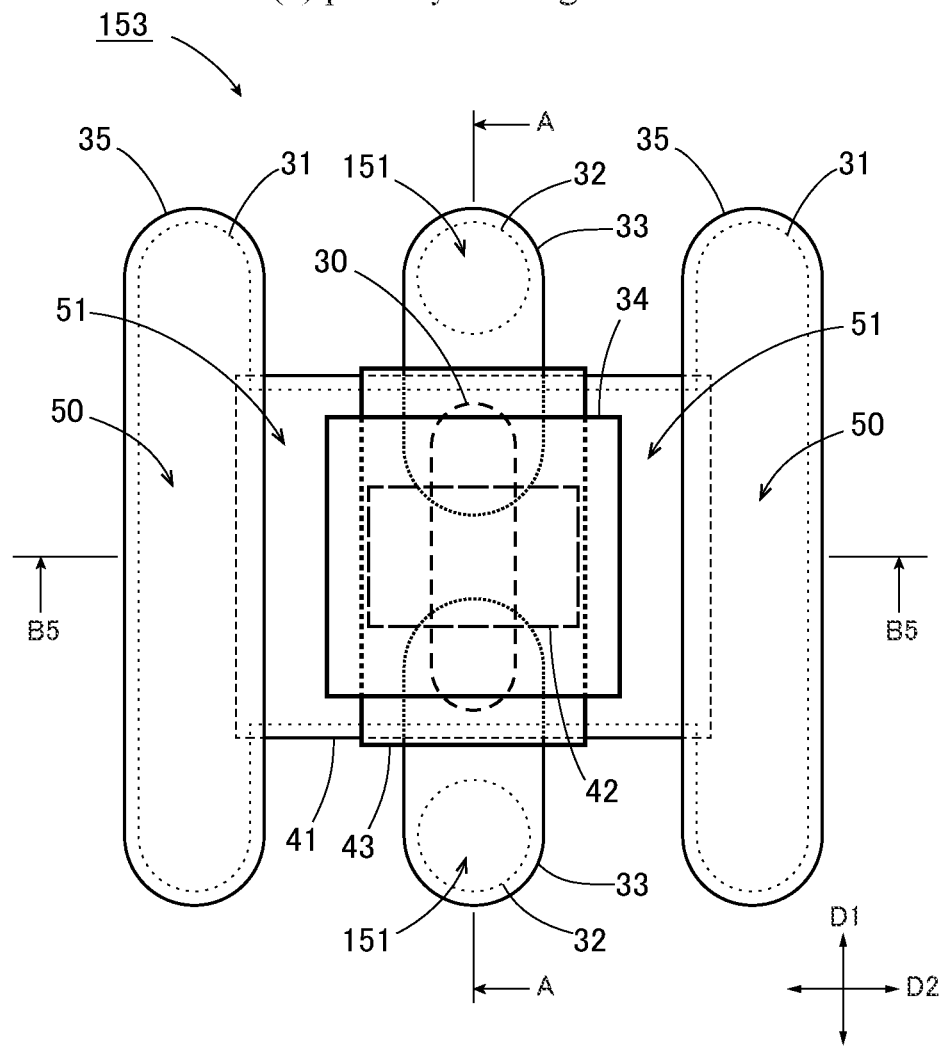
FIG. 10 is a diagram illustrating a configuration example of the main part of the ST substrate 15 according to a fourth embodiment of the present invention.
Figure 10:
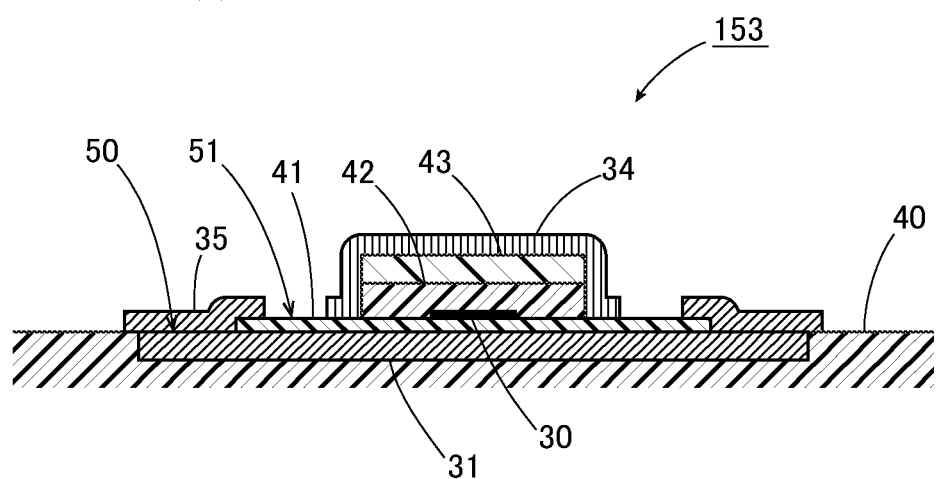
Figure 11:
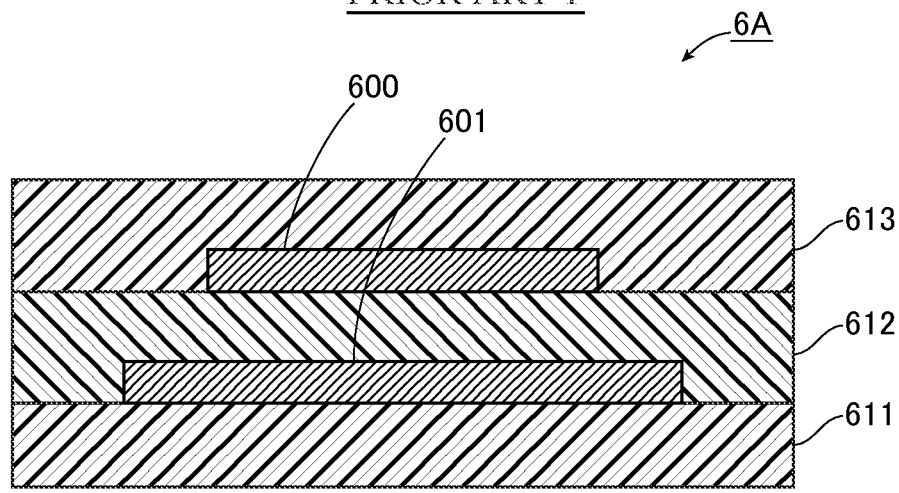
FIG. 11 is an explanatory diagram schematically illustrating a main part of a conventional multilayer wiring substrate 6A for probe card.

FIG. 10 is a diagram illustrating a configuration example of the main part of the ST substrate 15 according to a fourth embodiment of the present invention. FIG. 10(a) is a plan layout diagram illustrating a layout of components when the ST substrate 15 is viewed in a plan view, and FIG. 10(b) is a cross-sectional view (a B5-B5 cross-sectional view) illustrating a cross-section taken along a cutting line B5-B5 in FIG. 10(a). The cutting line B5-B5 is a straight line extending in the second direction D2 through the thin film resistor 30. Note that the cutting surface A-A is the same as that in FIG. 2(b), and thus redundant description will be omitted.

The embedded heat sink 31 extends from the thin film resistor 30 in both directions of the second direction D2, and a pair of heat dissipating portions 50 and a pair of exposed heat sinks 35 are arranged on both sides of the thin film resistor 30. The exposed heat sink 35 is connected to the common embedded heat sink 31 via the corresponding heat dissipating portion 50. Therefore, heat of the thin film resistor 30 can be dissipated using two exposed heat sinks 35, an area of the heat dissipating surface in contact with the atmosphere can be further increased, and the heat dissipation efficiency can be further improved.

Note that, also for the ST substrates 15 illustrated in FIG. 7 (first embodiment), FIG. 8 (second embodiment), and FIG. 9 (third embodiment), the pair of heat dissipating portions 50 can be formed on both sides of the thin film resistor 30, similarly to the case of the present embodiment.

DESCRIPTION OF REFERENCE NUMERALS 12 main substate
120 external terminal
121 connection terminal
13 reinforcing plate
14 connection substrate
140 pogo pin
15 ST substrate
150 connection terminal
151 electrode pad for probe
152 ceramic substrate
153 laminated structure
16 support member
17 probe
20 semiconductor wafer
21 movable stage
22 electrode pad
30a to 30c thin film resistor
31 embedded heat sink
32, 32a to 32c wiring electrode
33, 33a to 33c connection electrode
34 protective film
35 exposed heat sink
40 lower layer insulating film
41 base insulating film
42 separation insulating film
43 cover insulating film
50 heat dissipating portion
51 exposed region
52 protective region
100 probe card

The invention claimed is:

1. A multilayer wiring substrate for probe card, the multilayer wiring substrate being provided on a wiring path between an external terminal and a probe of a probe card, and having a base insulating film formed on a top surface of the multilayer wiring substrate, wherein the multilayer wiring substrate comprises:
a thin film resistor including a thin film formed on the base insulating film and to which a pair of connection electrodes are connected; and
an embedded heat sink that is embedded to face the thin film resistor via the base insulating film and includes a material having a thermal conductivity higher than that of the base insulating film, and
the embedded heat sink includes a heat dissipating portion that extends outside a region in which the thin film resistor is formed, and is not covered with the base insulating film.

2. The multilayer wiring substrate for probe card according to claim 1, further comprising a cover insulating film that is formed in a region corresponding to the thin film resistor, covers the thin film resistor, and is formed to expose a part of the base insulating film, wherein
the heat dissipating portion of the embedded heat sink is formed outside a region in which the cover insulating film is formed.

3. The multilayer wiring substrate for probe card according to claim 2, comprising an exposed heat sink that is simultaneously deposited on the heat dissipating portion and a predetermined region on the base insulating film adjacent to the heat dissipating portion and includes a material having a thermal conductivity higher than that of the base insulating film, wherein
the predetermined region of the exposed heat sink is connected to the embedded heat sink via the heat dissipating portion.

4. The multilayer wiring substrate for probe card according to claim 3, wherein the exposed heat sink is formed simultaneously with the connection electrodes.

5. The multilayer wiring substrate for probe card according to claim 3, comprising a protective film formed to face the thin film resistor via the cover insulating film, wherein
the exposed heat sink is formed simultaneously with the protective film.

6. The multilayer wiring substrate for probe card according to claim 3, wherein
the exposed heat sink has a protective region that is a region simultaneously deposited on the heat dissipating portion, on the cover insulating film, and on the predetermined region of the base insulating film adjacent to each of the heat dissipating portion and the cover insulating film, and facing the thin film resistor on the cover insulating film, and
the protective region is connected to the embedded heat sink through the predetermined region.

7. The multilayer wiring substrate for probe card according to claim 3, wherein the exposed heat sink includes a metal material formed by a plating method.

8. The multilayer wiring substrate for probe card according to claim 1, wherein
the pair of connection electrodes are provided at both ends in a first direction of the thin film resistor, and
the heat dissipating portion is formed in a second direction intersecting the first direction as viewed from the thin film resistor.

9. The multilayer wiring substrate for probe card according to claim 8, wherein
two or more of the thin film resistors are aligned separated from each other in the second direction, and
the embedded heat sink extends in the second direction and is embedded to face each of the two or more thin film resistors.

10. The multilayer wiring substrate for probe card according to claim 1, wherein the base insulating film includes an insulating resin material.

11. A probe card, wherein the probe is disposed on the multilayer wiring substrate for probe card according to claim 1.

* * * * *